(12) United States Patent
Karwat et al.

(10) Patent No.: US 10,738,795 B2
(45) Date of Patent: Aug. 11, 2020

(54) TURBOCHARGER WITH THERMO-DECOUPLED WHEEL CONTOUR INLET FOR WATER-COOLED COMPRESSOR HOUSING

(71) Applicant: HONEYWELL INTERNATIONAL INC., Morris Plains, NJ (US)

(72) Inventors: Cedric Karwat, Tomblaine (FR); Andreas Heckner, Remiremont (FR); Serge Kuhn, Thaon les Vosges (FR); Arnaud Gerard, Epinal (FR)

(73) Assignee: GARRETT TRANSPORTATION I INC., Torrance, CA (US)

( * ) Notice: Subject to any disclaimer, the term of this patent is extended or adjusted under 35 U.S.C. 154(b) by 220 days.

(21) Appl. No.: 15/900,972

(22) Filed: Feb. 21, 2018

(65) Prior Publication Data

US 2019/0257321 A1 Aug. 22, 2019

(51) Int. Cl.
| | | |
|---|---|---|
| *F04D 29/58* | (2006.01) | |
| *F04D 25/04* | (2006.01) | |
| *F04D 29/42* | (2006.01) | |
| *F02B 39/00* | (2006.01) | |
| *F02C 6/12* | (2006.01) | |
| *F01D 9/02* | (2006.01) | |
| *F01D 5/04* | (2006.01) | |
| *F01D 25/14* | (2006.01) | |
| *F02B 37/00* | (2006.01) | |

(52) U.S. Cl.
CPC .......... *F04D 29/584* (2013.01); *F01D 5/046* (2013.01); *F01D 9/026* (2013.01); *F01D 25/14* (2013.01); *F02B 39/005* (2013.01); *F02C 6/12* (2013.01); *F04D 25/04* (2013.01); *F04D 25/045* (2013.01); *F04D 29/4206* (2013.01); *F04D 29/5826* (2013.01); *F04D 29/5853* (2013.01); *F02B 37/00* (2013.01); *F05D 2220/40* (2013.01)

(58) Field of Classification Search
None
See application file for complete search history.

(56) References Cited

U.S. PATENT DOCUMENTS

| 7,010,916 | B2 | 3/2006 | Sumser et al. | |
|---|---|---|---|---|
| 8,511,083 | B2 * | 8/2013 | Arnold | F04D 27/0207 60/598 |
| 9,617,910 | B2 * | 4/2017 | Maeda | F02B 39/005 |

FOREIGN PATENT DOCUMENTS

| DE | 102007023142 A1 | 11/2008 |
|---|---|---|
| WO | 2012/079664 A1 | 6/2012 |
| WO | 2015097522 A1 | 7/2015 |

* cited by examiner

*Primary Examiner* — Christopher Verdier
*Assistant Examiner* — Jason A Fountain
(74) *Attorney, Agent, or Firm* — Lorenz & Kopf, LLP

(57) ABSTRACT

A compressor section includes a compressor wheel and a compressor housing that surrounds the compressor wheel. The compressor housing includes a flow passage with an upstream area. The compressor section also includes a cooling pocket that is defined within the compressor housing. The cooling pocket is configured to receive a coolant for cooling the compressor housing. Furthermore, the compressor section includes a thermo-decoupling pocket that is defined within the compressor housing. The thermo-decoupling pocket is disposed between the cooling pocket and the upstream area of the flow passage. The thermo-decoupling pocket is fluidly connected to an exterior area outside the compressor housing.

20 Claims, 3 Drawing Sheets

TURBOCHARGER WITH THERMO-DECOUPLED WHEEL CONTOUR INLET FOR WATER-COOLED COMPRESSOR HOUSING

TECHNICAL FIELD

The present disclosure generally relates to a turbocharger and, more particularly, to a turbocharger with a thermo-decoupled wheel contour inlet for a water-cooled compressor housing.

BACKGROUND

Turbochargers typically include a compressor section with a housing and a compressor wheel rotatably supported in a flow passage of the housing. The compressor wheel is driven, in some embodiments, by a turbine section of the turbocharger. Specifically, the compressor wheel is fixed on a common shaft as a turbine wheel, which is driven in rotation by exhaust gas flowing through the turbine section. The compressor section, in turn, compresses air that flows through the compressor housing toward an engine, toward a downstream compressor section of a multi-stage compressor, etc.

The compressor section may generate heat during operation. The heat may degrade operating efficiency of the turbocharger. Some compressor housings may include features that promote cooling. However, cooling some turbocharger compressor sections remains difficult.

Accordingly, it is desirable to provide a turbocharger compressor section with features that provide improved cooling. These features may improve performance of the turbocharger. Other desirable features and characteristics of the present disclosure will become apparent from the subsequent detailed description and the appended claims, taken in conjunction with the accompanying drawings and this background discussion.

BRIEF SUMMARY

In one embodiment, a compressor section of a turbocharger is disclosed. The compressor section includes a compressor wheel and a compressor housing that surrounds the compressor wheel. The compressor housing includes a flow passage with an upstream area. The compressor section also includes a cooling pocket that is defined within the compressor housing. The cooling pocket is configured to receive a coolant for cooling the compressor housing. Furthermore, the compressor section includes a thermo-decoupling pocket that is defined within the compressor housing. The thermo-decoupling pocket is disposed between the cooling pocket and the upstream area of the flow passage. The thermo-decoupling pocket is fluidly connected to an exterior area outside the compressor housing.

In another embodiment, a compressor section of a turbocharger is disclosed. The compressor section includes a compressor wheel and a compressor housing that surrounds the compressor wheel. The compressor housing includes a flow passage with an upstream area. The compressor section also includes a cooling pocket that is defined within the compressor housing. The cooling pocket is configured to receive a coolant for cooling the compressor housing. The compressor section further includes a thermo-decoupling pocket that is defined within the compressor housing. The thermo-decoupling pocket is disposed between the cooling pocket and the upstream area of the flow passage. The thermo-decoupling pocket is fluidly disconnected from the flow passage.

In a further embodiment, a turbocharger with a compressor section is disclosed. the compressor section includes a compressor wheel and a compressor housing that surrounds the compressor wheel. The compressor housing includes a flow passage. The flow passage includes an inducer diameter surface, a compressor contour, a diffuser area, and a volute member that are arranged in sequence in a downstream direction of the flow passage. The compressor housing also includes a cooling pocket that is defined within the compressor housing proximate at least one of the diffuser area and the volute member. The cooling pocket is configured to receive a coolant for cooling the compressor housing. Furthermore, the compressor housing includes a thermo-decoupling pocket that is defined within the compressor housing. The thermo-decoupling pocket is disposed between the cooling pocket and both the inducer diameter surface and the compressor contour. The thermo-decoupling pocket is fluidly connected to an exterior area outside the compressor housing. The thermo-decoupling pocket is fluidly disconnected from the flow passage.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a turbocharger with a compressor section having improved cooling characteristics. In particular, the compressor section may be water-cooled and may have one or more cooling pockets that receive a coolant for removing heat from the housing. The cooling pocket may be disposed proximate a diffuser area and/or a volute chamber of the flow passage of the compressor housing. The compressor section may also include a thermo-decoupled pocket that is disposed between the cooling pocket and an upstream area of the flow passage. The thermo-decoupled pocket may be fluidly connected to an exterior area outside the compressor housing so that ambient air is received within the thermo-decoupled pocket. Additionally, in some embodiments, the thermo-decoupled pocket may be fluidly disconnected from the flow passage of the compressor housing. Accordingly, the thermo-decoupled pocket may thermally decouple and isolate the coolant within the cooling pocket from upstream areas of the flow passage. The compressor section may operate more efficiently as a result. Additional details of the present disclosure will be discussed below.

Figure 1:
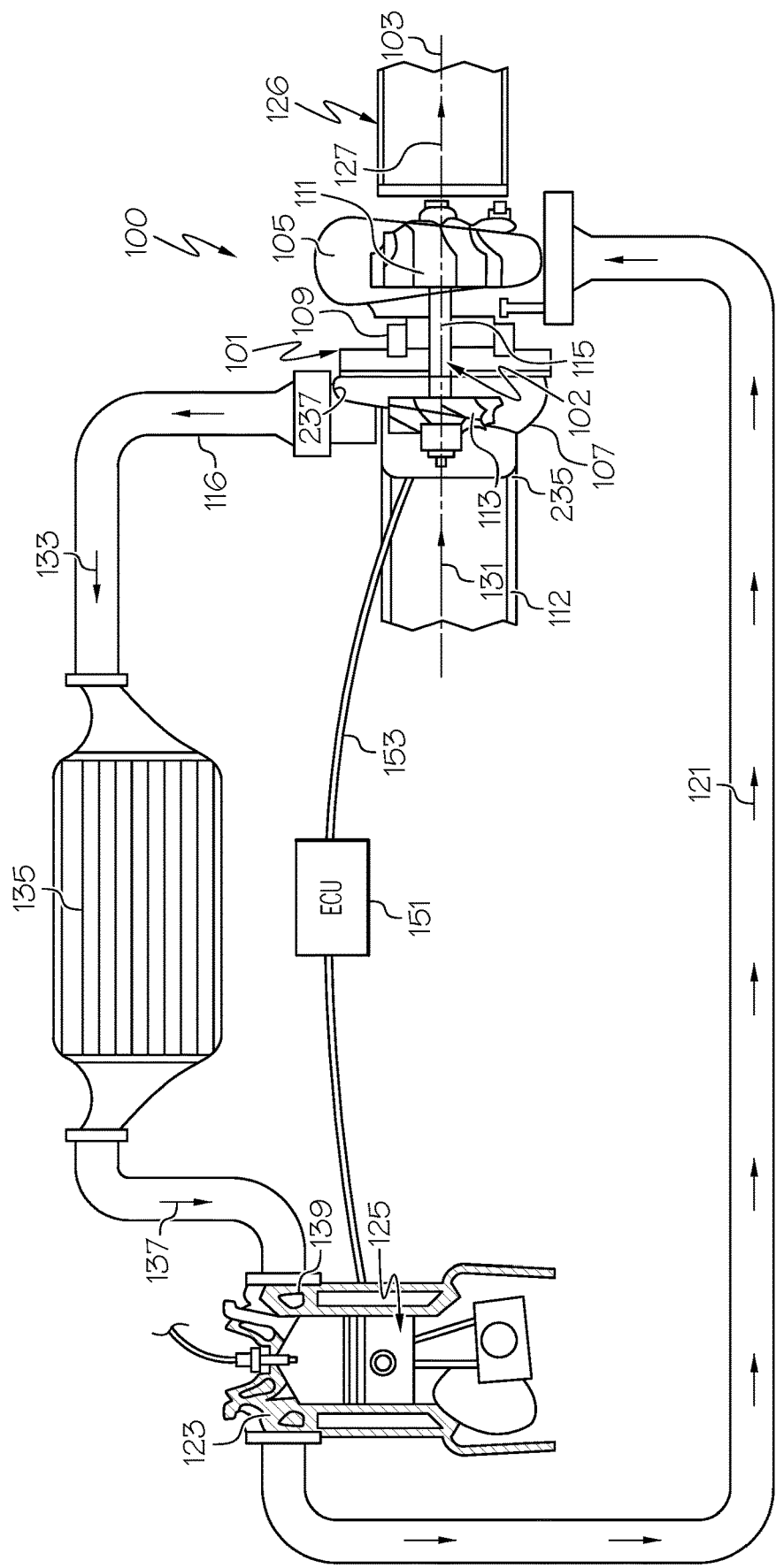
FIG. 1 is a schematic view of a turbocharger of a vehicle, which is connected to an engine and an intercooler according to example embodiments of the present disclosure.

FIG. 1 is a schematic view of a turbocharger 100 that includes a turbocharger housing 101 and a rotor 102. The rotor 102 is configured to rotate within the turbocharger housing 101 about an axis of rotor rotation 103. The rotor 102 may be supported for rotation about the axis 103 via one or more bearings (not shown). In some embodiments, the rotor 102 may be rotationally supported by thrust bearings and a plurality of journal bearings. Alternatively, other bearings may be included.

As shown in the illustrated embodiment, the turbocharger housing 101 may include a turbine housing 105, a compressor housing 107, and a bearing housing 109. The bearing housing 109 may be disposed between the turbine and compressor housings 105, 107. Also, in some embodiments, the bearing housing 109 may contain the bearings of the rotor 102.

Additionally, the rotor 102 includes a turbine wheel 111, a compressor wheel 113, and a shaft 115. The turbine wheel 111 is located substantially within the turbine housing 105. The compressor wheel 113 is located substantially within the compressor housing 107. The shaft 115 extends along the axis of rotation 103, through the bearing housing 109, to connect the turbine wheel 111 to the compressor wheel 113. Accordingly, the turbine wheel 111 and the compressor wheel 113 rotate together about the axis 103.

The turbine housing 105 and the turbine wheel 111 cooperate to form a turbine (i.e., turbine section, turbine stage) configured to circumferentially receive a high-pressure and high-temperature exhaust gas stream 121 from an engine, e.g., from an exhaust manifold 123 of an internal combustion engine 125. The turbine wheel 111 (and thus the rotor 102) is driven in rotation around the axis 103 by the high-pressure and high-temperature exhaust gas stream 121, which becomes a lower-pressure and lower-temperature exhaust gas stream 127 that is axially released into an exhaust system 126.

The compressor housing 107 and compressor wheel 113 cooperate to form a compressor (i.e., compressor section, compressor stage) of the turbocharger 100. An inlet pipe 112 may be connected to the compressor housing 107 for axially delivering input air 131 (e.g., ambient air or already-pressurized air from a previous stage in a multi-stage compressor). The compressor wheel 113, being driven in rotation by the exhaust-gas driven turbine wheel 111, is configured to compress the input air 131 into a pressurized air stream 133 that is ejected circumferentially from the compressor housing 107 to an outlet pipe 116. Due to the compression process, the pressurized air stream 133 is characterized by an increased temperature, over that of the input air.

In some embodiments, the pressurized air stream 133 may be channeled through an air cooler 135 (i.e., intercooler), such as a convectively cooled charge air cooler. The air cooler 135 may be configured to dissipate heat from the pressurized air stream 133, increasing its density. The resulting cooled and pressurized output air stream 137 is channeled into an intake manifold 139 on the internal combustion engine 125, or alternatively, into a subsequent-stage, in-series compressor. The operation of the system is controlled by an ECU 151 (engine control unit) that connects to the remainder of the system via communication connections 153.

It will be appreciated that the turbocharger 100 may have one of a variety of configurations that may or may not correspond with the illustrated embodiment. For example, the turbocharger 100 may be configured as an e-charger in some embodiments, such that the turbine section is omitted and the compressor wheel 113 is driven instead by an electric motor. Furthermore, in some embodiments of the present disclosure, the turbocharger 100 may be configured as a supercharger, such that the compressor wheel 113 is driven mechanically by the engine 125.

Figure 2:
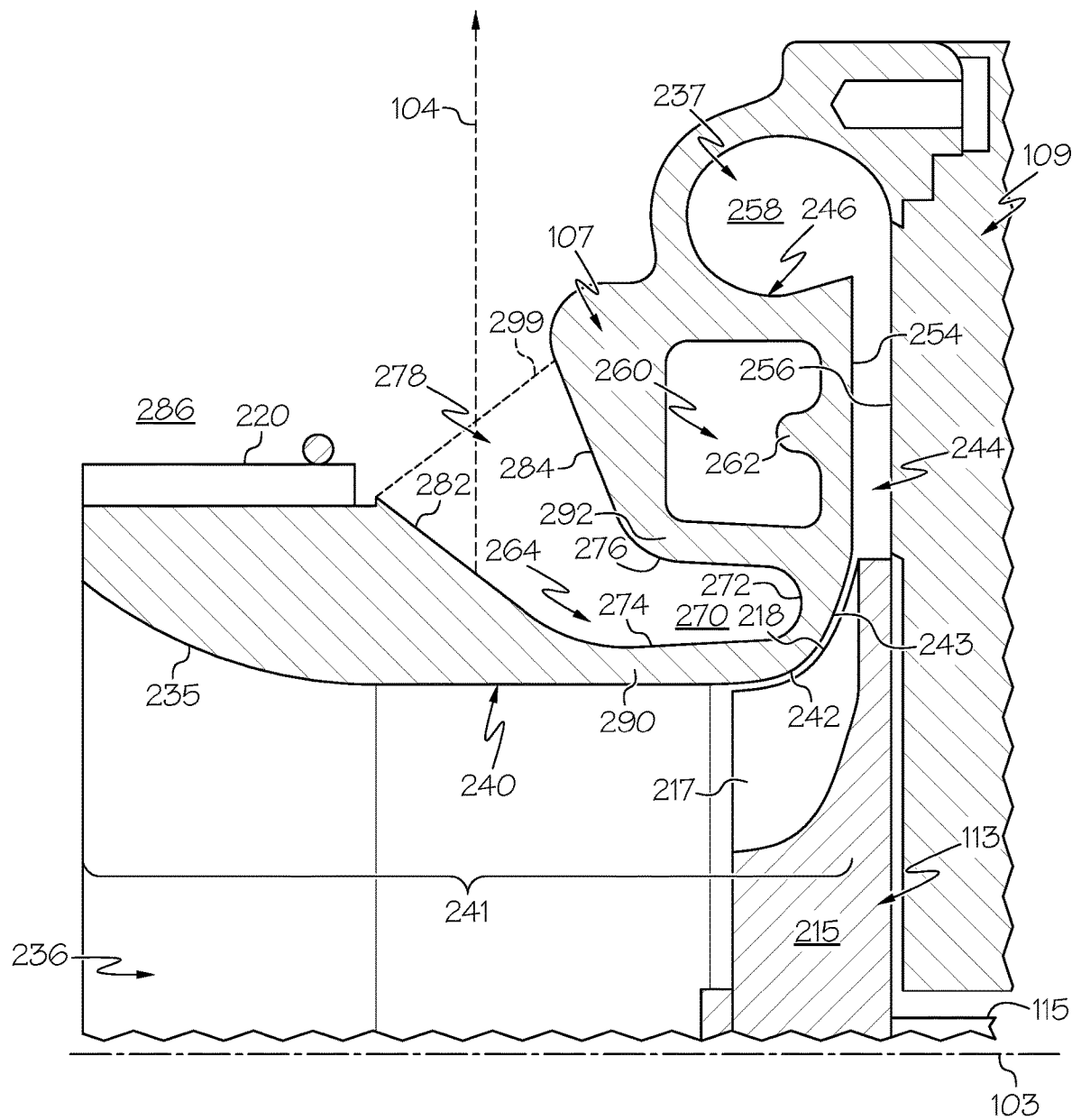
FIG. 2 is a cross section of a compressor section of the turbocharger of FIG. 1 according to example embodiments of the present disclosure.

Referring now to FIG. 2, a cross section of an area of the turbocharger 100 is shown. The cross section is taken along the axis 103, and portions of the compressor housing 107 and the compressor wheel 113 are shown. An example radial axis 104, which extends normal to the axis of rotation 103, is also shown for reference purposes.

The compressor wheel 113 includes a hub 215 and plurality of blades 217. The hub 215 may be fixed to an end of the shaft 115, and the blades 217 may extend outward radially from the hub 215. The blades 217 may collectively define an outer contour profile 218 of the compressor wheel 113. As represented in FIG. 2, the outer contour profile 218 may be generally concave and may be contoured along one or more radii.

Figure 3:
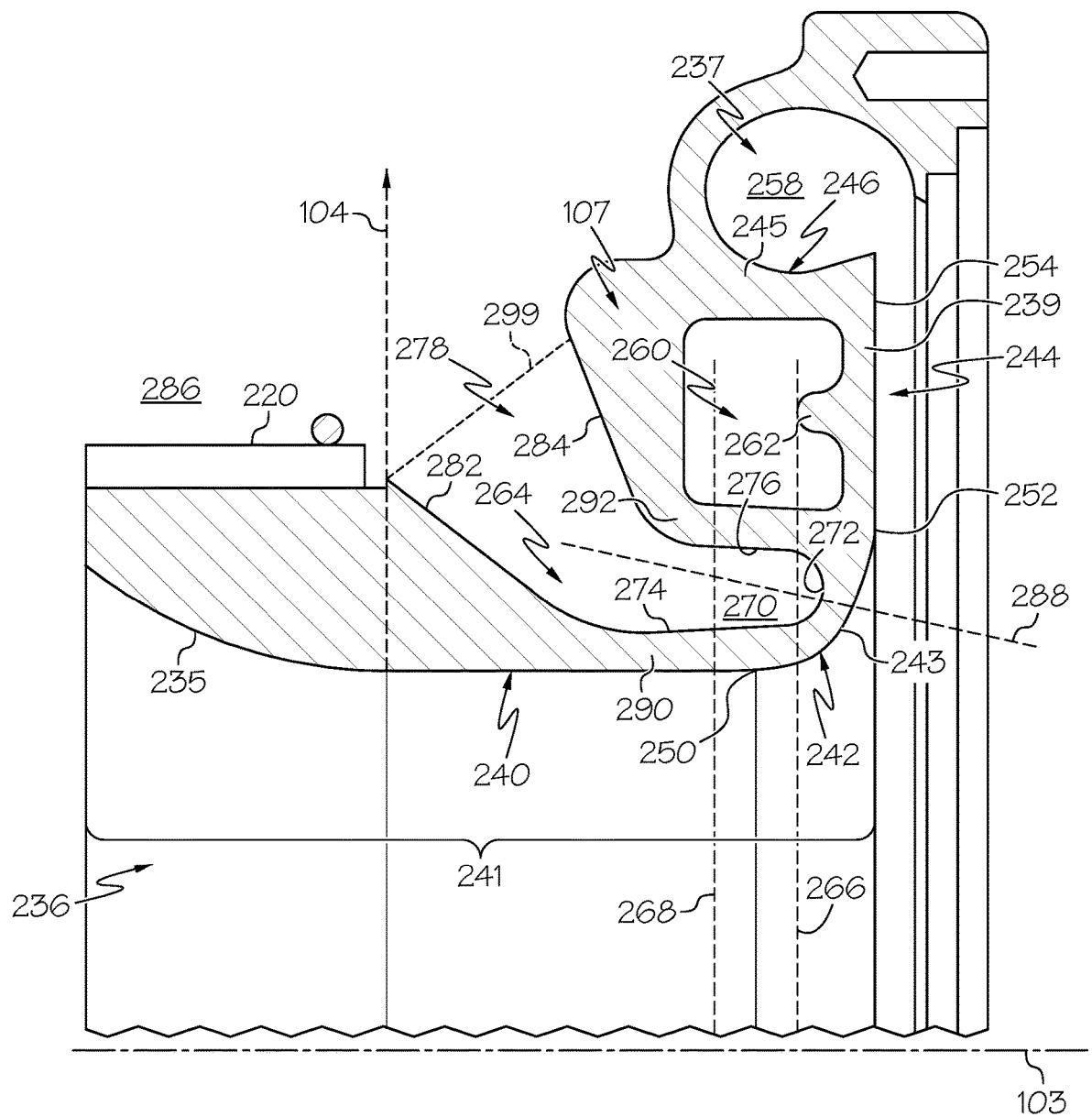
FIG. 3 is a cross section of the compressor housing of the compressor section of FIG. 2.

The compressor housing 107 may include a flow passage 236 extending therethrough from an inlet 235 to an outlet 237. As shown in FIG. 1, the inlet 235 may be fluidly connected to the inlet pipe 112, for example, via a connector 220 (FIGS. 2 and 3). The outlet 237 (discharge outlet) of the compressor housing 107 may be fluidly connected to the outlet pipe 116 as shown in FIG. 1. The compressor wheel 113 may be disposed within the flow passage 236 and may be supported for rotation therein. As will be discussed, the compressor housing 107 may include various features that direct the input air 131 in a downstream direction from the inlet 235 to the outlet 237. The compressor housing 107 also includes one or more features that improve cooling of the compressor stage. Accordingly, the turbocharger 100 may have improved performance, increased efficiency, etc. as a result.

The compressor housing 107 may be a hollow member that defines the flow passage 236 as well as other chambers, pockets, passages, apertures, etc. The compressor housing 107 may be referred to as a "compressor cover" in that it surrounds and covers a majority of the compressor wheel 113. As shown in FIG. 1, the compressor housing 107 may cooperate with the bearing housing 109 to cover over the back side (downstream side) of the compressor wheel 113.

In some embodiments, the compressor housing 107 may be a unitary, monolithic single-piece member. In other embodiments, the compressor housing 107 may be assembled from multiple pieces that are attached and, in some cases, sealed together.

Additionally, in some embodiments, the compressor housing 107 may be formed substantially by casting methods. In additional embodiments, the turbine housing 105 may be formed via additive manufacturing (e.g., 3D printing) methods. In some embodiments, the compressor housing 107 may have a predetermined minimum wall thickness. The minimum wall thickness may be approximately four millimeters (4 mm) in some embodiments. However, the wall thicknesses of the compressor housing 107 may be determined according to the mechanical loads on the particular region of the housing 107, according to the thermal considerations for the region, according to manufacturability, and/or according to other considerations.

As shown in FIGS. 2 and 3, the flow passage 236 of the compressor housing 107 may be collectively defined by the compressor inlet 235, an inducer diameter surface 240, a compressor contour 242, a diffuser area 244, and a volute member 246, each of which will be discussed in detail below. The inlet 235, the inducer diameter surface 240, and the compressor contour 242 may collectively define an upstream area 241 of the flow passage 236. The upstream area 241 may generally extend along and may be centered on the axis 103. The inner diameter or width of the upstream area 241 may vary (i.e., taper) along the axis 103. The diffuser area 244 may extend radially away from the axis 103 and toward the volute member 246. The volute member 246 may be fluidly connected to the outlet 237. Accordingly, the inlet 235, the inducer diameter surface 240, the compressor contour 242, the diffuser area 244, and the volute member 246 may be arranged in sequence in a downstream direction from the inlet 235 to the outlet 237.

It will be appreciated that the cross sectional profile of the flow passage 236 shown in FIGS. 2 and 3 is merely exemplary. The shape, dimension, and/or other feature of the flow passage 236 may vary from the illustrated embodiment without departing from the scope of the present disclosure.

In some embodiments, the inlet 235 may taper inward along the axis 103 in the downstream direction. In other words, the width or diameter of the inlet 235 may gradually reduce in the downstream direction along the axis 103. The inlet 235 may be connected at its downstream end to the inducer diameter surface 240.

Additionally, in some embodiments, the inducer diameter surface 240 may have a diameter or width measured normal to the axis 103 (i.e., parallel to the radial axis 104). The diameter (width) of the inducer diameter surface 240 may remain substantially constant along the axial length (along the axis 103) as the inducer diameter surface 240 extends away from the inlet 235). In some embodiments, an upstream end of the compressor wheel 113 may be received between opposing areas of the inducer diameter surface 240.

Furthermore, the compressor contour 242 may include an upstream end 250, which is connected to the inducer diameter surface 240. The compressor contour 242 may also include an opposite downstream end 252. The compressor contour 242 may taper outward in the downstream direction along the axis 103. In other words, the width or diameter of the compressor contour 242 may gradually increase in the downstream direction along the axis 103.

The compressor contour 242 may have an inner contour profile 243. The inner contour profile 243 may be generally convex and may be contoured along one or more radii. A majority of the compressor wheel 113 may be received within the compressor contour 242 of the compressor housing 107. The radius, shape, dimension, contour, profile, etc. of the inner contour profile 243 may be configured according to that of the outer contour profile 218 of the compressor wheel 113 (FIG. 2). In other words, the inner contour profile 243 of the compressor housing 107 may correspond to and may substantially match the outer contour profile 218 of the compressor wheel 113, leaving a predetermined amount of clearance therebetween (e.g., between 0.20 millimeters and 0.30 millimeters of clearance). The downstream end 252 of the compressor contour 242 may be fluidly connected to the diffuser area 244.

The diffuser area 244 may be defined between a first diffuser face 254 and a second diffuser face 256. The first and second diffuser faces 254, 256 may be substantially parallel to each other and may extend substantially normal and radially relative to the axis 103. The first and second diffuser faces 254, 256 may be spaced apart slightly along the axis 103 with the diffuser area 244 defined therebetween. A portion of the compressor wheel 113 may also extend into the diffuser area 244. In some embodiments represented in FIG. 2, the first diffuser face 254 may be included on the compressor housing 107, and the second diffuser face 256 may comprise an outer surface of the bearing housing 109, which faces the back axial side of the compressor wheel 113. The diffuser area 244 may be a vaneless diffuser area in some embodiments and may convert air moving away from the compressor wheel 113 into static pressure. The diffuser area 244 may also be fluidly connected at the outer radial area to the volute member 246.

The volute member 246 may define a volute chamber 258 that extends circumferentially about the axis 103. The width of the volute chamber 258 may become gradually larger in the circumferential direction as the volute chamber 258 approaches the outlet 237. The volute chamber 258 may gather air as it exits the compressor wheel 113. The volute chamber 258 may be fluidly connected to the outlet 237, and the air collected in the volute chamber 258 may exit the compressor housing 107 therethrough.

It will be appreciated that the compressor section may heat the air as it is compressed. This heat may transfer to the compressor housing 107. To avoid overheating, the compressor housing 107 may include at least one cooling pocket 260. In other words, the compressor housing 107 may be a "water-cooled" compressor housing 107.

The cooling pocket 260 may be disposed proximate the diffuser area 244 and/or the volute member 246. A diffuser wall 239 may separate the cooling pocket 260 from the diffuser area 244 in the axial direction (parallel to the axis 103). An outer wall 245 may separate the cooling pocket 260 from the volute chamber 258 in the radial direction (parallel to the radial axis 104). In some embodiments, the cooling pocket 260 may have a B-shaped cross section. This cross sectional shape may be substantially consistent for a majority of the compressor housing 107 in the circumferential direction. The cooling pocket 260 may include a projection 262 that projects inward from the diffuser wall 239 into the cooling pocket 260 and axially away from the diffuser area 244. The cooling pocket 260 may be configured to receive a liquid coolant that circulates therethrough for cooling the compressor housing 107. The coolant may circulate through the cooling pocket 260 and through the compressor housing 107 in the circumferential direction, thereby transferring heat away from the air in the diffuser area 244, from the diffuser wall 239, from the air in the volute member 246, and/or from the outer wall 245.

The compressor housing 107 may further include a thermo-decoupled pocket 264. Generally, the thermo-decoupled pocket 264 may thermally isolate, space apart, and otherwise decouple the coolant within the cooling pocket 260 from areas of the compressor housing 107 and the flow passage 236 that are further upstream. Accordingly, the thermo-decoupled pocket 264 may prevent heat in the coolant and in the downstream areas of the compressor housing 107 (the diffuser area 244 and the volute member 246) from transferring upstream in the compressor housing 107 and/or to the air within the upstream area 241.

In some embodiments, the thermo-decoupled pocket 264 may include a first portion (i.e., an arcuate portion) 270. The first portion 270 may be defined by an inner diameter surface 274, an opposing outer diameter surface 276, and an aft interior surface 272, which is contoured between the inner and outer diameter surfaces 274, 276. The first portion 270 may be elongate in the axial cross section of FIGS. 2 and 3. This cross sectional shape of the first portion 270 of the thermo-decoupled pocket 264 may be substantially continuous as it extends arcuately in the circumferential direction about the axis 103.

An inlet area wall 290 may separate the first portion 270 of the thermo-decoupled pocket 264 from the inducer diameter surface 240 and the compressor contour 242 of the flow passage 236. Also, an internal wall 292 may separate the cooling pocket 260 from the first portion 270 of the thermo-decoupled pocket 264.

The thermo-decoupled pocket 264 may further include a second portion (i.e., an opening or aperture) 278. The second portion 278 may extend forward and outward radially from the forward end of the first portion 270. In some embodiments, the second portion 278 may taper outwardly and gradually widen as the second portion 278 extends further outward from the first portion 270. The second portion 278 may be open to and may be fluidly connected to the ambient pressure in an exterior area 286 defined outside the compressor housing 107. Moreover, in some embodiments, the thermo-decoupled pocket 264 may be fluidly disconnected from the flow passage 236. Stated differently, the inlet area wall 290 may be continuous and port-less such that the thermo-decoupled pocket 264 remains fluidly disconnected from the flow passage 236. Accordingly, the thermo-decoupled pocket 264 may contain ambient air for thermo-decoupling the cooling pocket 260 and the upstream area 241 of the flow passage 236.

In some embodiments, the cross sectional shape of the thermo-decoupled pocket 264 within the compressor housing 107 may be substantially consistent in the circumferential direction. In other embodiments, the cross sectional shape of the pocket 264 may vary about the axis 103. In some embodiments, the compressor housing 107 may include one or more bracing members, which are represented in FIGS. 2 and 3 by a broken line 299. The bracing member 299 may be a strut, a buttress, a brace, a joist, a bracket, an arm, or other bracing member that extends across the second portion 278 to opposing surfaces of the compressor housing 107. The bracing member 299 may provide structural support and increased strength for the compressor housing 107.

The shape, location, dimension, and/or other features of the thermo-decoupled pocket 264 and/or other features of the housing 107 may be configured according to a thermal boundary line 288 represented in FIG. 3. The boundary line 288 may be disposed at an acute angle relative to the axis 103. Above the line (outward radially), temperatures of the compressor housing 107 and fluids therein may be relatively high. Below the line (inward radially), temperatures may remain relatively low. The thermo-decoupled pocket 264 may be substantially bisected by the boundary line 288 in some embodiments, with the cooling pocket 260, the diffuser area 244, and the volute member 246 disposed on one side, and with the upstream area 241 disposed on the opposite side. Accordingly, fluid within the cooling pocket 260 may provide cooling to the diffuser area 244 and the volute member 246, and the thermo-decoupled pocket 264 may prevent heat from transferring upstream to the inducer diameter surface 240, to the compressor contour 242, etc.

Accordingly, at least part of the thermo-decoupled pocket 264 may be disposed generally between the cooling pocket 260 and the upstream area 241 of the flow passage 236. As shown in FIG. 3, the first portion 270 of the thermo-decoupled pocket 264 may be disposed between the cooling pocket 260 and the compressor contour 242 in the radial direction (e.g., parallel to the radial axis 104). In some embodiments, an imaginary plane 266 that is normal to the axis 103 intersects the cooling pocket 260, the compressor contour 242, and the first portion 270 of the thermo-decoupled pocket 264.

Likewise, the first portion 270 of the thermo-decoupled pocket 264 may be disposed radially between the cooling pocket 260 and the inducer diameter surface 240. Accordingly, an imaginary plane 268 that is normal to the axis 103 may intersect the cooling pocket 260, the inducer diameter surface 240, and the first portion 270 of the thermo-decoupled pocket 264.

Therefore, in summary, the compressor section of the turbocharger 100 may be water-cooled so as to provide localized cooling to downstream areas (e.g., the diffuser area 244 and volute member 246) of the compressor housing 107. However, the thermo-decoupled pocket 264 may be configured to prevent this heat from transferring to the upstream area 241 of the housing 107 and flow passage 236. As a result, the operating efficiency of the turbocharger 100 may be increased.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A compressor section of a turbocharger comprising:
   a compressor wheel;
   a compressor housing that surrounds the compressor wheel, the compressor housing including a flow passage with an upstream area, the upstream area including a compressor contour that is contoured according to the compressor wheel;
   a cooling pocket that is defined within the compressor housing, the cooling pocket configured to receive a coolant for cooling the compressor housing; and
   a thermo-decoupling pocket that is defined within the compressor housing, the thermo-decoupling pocket being disposed between the cooling pocket and the compressor contour of the upstream area, the thermo-decoupling pocket being fluidly connected to an exterior area outside the compressor housing.

2. The compressor section of claim 1, wherein the cooling pocket, the thermo-decoupling pocket, and the compressor contour intersect an imaginary plane;
   wherein the imaginary plane extends normal to a longitudinal axis of the upstream area of the flow passage.

3. The compressor section of claim 1, wherein the upstream area includes an inducer diameter surface that extends along a longitudinal axis;
   wherein the inducer diameter surface has a substantially constant diameter; and
   wherein the thermo-decoupling pocket is disposed between the cooling pocket and the inducer diameter surface.

4. The compressor section of claim 3, wherein the cooling pocket, the thermo-decoupling pocket, and the inducer diameter surface intersect an imaginary plane;
   wherein the imaginary plane extends normal to the longitudinal axis.

5. The compressor section of claim 1, wherein the thermo-decoupling pocket is fluidly disconnected from the flow passage.

6. The compressor section of claim 1, wherein the thermo-decoupling pocket includes a first portion and a second portion;
wherein the first portion is disposed between the cooling pocket and the upstream area of the flow passage; and
wherein the second portion extends radially outward from a longitudinal axis of the flow passage to fluidly connect the first portion to the exterior area outside the compressor housing.

7. The compressor section of claim 6, wherein the first portion has an elongate cross section and wherein the first portion extends annularly about the longitudinal axis.

8. The compressor section of claim 6, wherein the second portion tapers outward toward the exterior area outside the compressor housing.

9. The compressor section of claim 1, wherein the thermo-decoupling pocket separates an inlet area wall of the compressor housing from an internal wall of the compressor housing;
wherein the inlet area wall defines the upstream area of the flow passage and the thermo-decoupling pocket; and
wherein the internal wall defines the thermo-decoupling pocket and the cooling pocket.

10. The compressor section of claim 1, wherein the flow passage includes an inducer diameter surface, the compressor contour, a diffuser area, and a volute member arranged sequentially in a downstream direction of the flow passage;
wherein the cooling pocket is arranged proximate the diffuser area;
wherein an outer wall of the compressor housing separates the cooling pocket from a volute chamber in the volute member; and
wherein the thermo-decoupling pocket is disposed between the cooling pocket and both the inducer diameter surface and the compressor contour.

11. The compressor section of claim 10, wherein the compressor housing includes a diffuser wall that separates the cooling pocket from the diffuser area; and
further comprising a projection that projects inward from the diffuser wall into the cooling pocket and away from the diffuser area.

12. A compressor section of a turbocharger comprising:
a compressor wheel;
a compressor housing that surrounds the compressor wheel, the compressor housing including a flow passage with an upstream area, the upstream area including a compressor contour that is contoured according to the compressor wheel;
a cooling pocket that is defined within the compressor housing, the cooling pocket configured to receive a coolant for cooling the compressor housing; and
a thermo-decoupling pocket that is defined within the compressor housing, the thermo-decoupling pocket being disposed between the cooling pocket and the compressor contour of the upstream area, the thermo-decoupling pocket being fluidly disconnected from the flow passage.

13. The compressor section of claim 12, wherein the thermo-decoupling pocket includes a first portion and a second portion;
wherein the first portion is disposed between the cooling pocket and the upstream area of the flow passage; and
wherein the second portion fluidly connects the first portion to an exterior area outside the compressor housing.

14. The compressor section of claim 12, wherein the cooling pocket, the thermo-decoupling pocket, and the compressor contour intersect an imaginary plane;
wherein the imaginary plane extends normal to a longitudinal axis of the upstream area of the flow passage.

15. The compressor section of claim 12, wherein the upstream area includes an inducer diameter surface that extends along a longitudinal axis;
wherein the inducer diameter surface has a substantially constant diameter; and
wherein the thermo-decoupling pocket is disposed between the cooling pocket and the inducer diameter surface.

16. The compressor section of claim 15, wherein the cooling pocket, the thermo-decoupling pocket, and the inducer diameter surface intersect an imaginary plane;
wherein the imaginary plane extends normal to the longitudinal axis.

17. The compressor section of claim 12, wherein the thermo-decoupling pocket includes a first portion and a second portion;
wherein the first portion is disposed between the cooling pocket and the upstream area of the flow passage; and
wherein the second portion extends radially outward from a longitudinal axis of the flow passage to fluidly connect the first portion to an exterior area outside the compressor housing.

18. The compressor section of claim 17, wherein the first portion has an elongate cross section and wherein the first portion extends annularly about the longitudinal axis.

19. The compressor section of claim 17, wherein the second portion tapers outward toward the exterior area outside the compressor housing.

20. A turbocharger with a compressor section comprising:
a compressor wheel;
a compressor housing that surrounds the compressor wheel, the compressor housing including a flow passage, the flow passage including an inducer diameter surface, a compressor contour that is contoured according to the compressor wheel, a diffuser area, and a volute member that are arranged in sequence in a downstream direction of the flow passage;
a cooling pocket that is defined within the compressor housing proximate at least one of the diffuser area and the volute member, the cooling pocket configured to receive a coolant for cooling the compressor housing; and
a thermo-decoupling pocket that is defined within the compressor housing, the thermo-decoupling pocket being disposed between the cooling pocket and both the inducer diameter surface and the compressor contour, the thermo-decoupling pocket being fluidly connected to an exterior area outside the compressor housing, the thermo-decoupling pocket being fluidly disconnected from the flow passage.

* * * * *